United States Patent [19]
Hess et al.

[11] Patent Number: 5,466,369
[45] Date of Patent: * Nov. 14, 1995

[54] LIQUID CIRCULATING DEVICE

[76] Inventors: Irwin H. Hess, 12700 Lake Ave., Ste. 2712, Lakewood, Ohio 44107; Leo D. Weber, 345 Parkside Dr., Erie, Pa. 16511

[*] Notice: The portion of the term of this patent subsequent to Jul. 28, 2009, has been disclaimed.

[21] Appl. No.: 325,492

[22] Filed: Oct. 19, 1994

Related U.S. Application Data

[63] Continuation-in-part of Ser. No. 919,263, Jul. 27, 1992, abandoned.

[51] Int. Cl.[6] .................... B01F 3/04; C02F 3/28
[52] U.S. Cl. ............... 210/220; 261/77; 261/123
[58] Field of Search ..................... 210/220, 170, 210/194; 261/75, 77, 123, 153; 137/209

[56] References Cited

U.S. PATENT DOCUMENTS

| | | | |
|---|---|---|---|
| 3,246,761 | 4/1966 | Bryan et al. | 261/77 |
| 3,704,009 | 11/1972 | Kalbskopf | 261/91 |
| 3,872,010 | 3/1975 | Nagahama | 210/219 |
| 4,169,873 | 10/1979 | Lipert | 261/77 |
| 4,187,263 | 2/1980 | Lipert | 261/77 |
| 4,293,506 | 10/1981 | Lipert | 261/77 |
| 4,356,131 | 10/1982 | Lipert | 261/77 |
| 4,569,757 | 2/1986 | Moore | 261/77 |
| 4,569,804 | 2/1986 | Murphy | 261/77 |
| 4,752,421 | 6/1988 | Makino | 261/77 |
| 5,133,907 | 7/1992 | Weber et al. | 261/153 |

Primary Examiner—Cynthia L. Nessler
Attorney, Agent, or Firm—George C. Atwell

[57] ABSTRACT

A liquid circulating device is provided for submersion in a large holding tank to effect continuous mixing and circulation of a liquid material, such as sewage sludge, contained therein in order to facilitate the digestion of the liquid material for environmentally safe disposal. The device includes an upright, elongated stackpipe secured to the floor of the holding tank and a gas bubble generator mounted to the stackpipe for generating gas bubbles into the stackpipe. The gas bubble generator includes an interior chamber with a substantially open bottom, a pair of baffle members transversely extending within the interior chamber and an inverted cone-shaped member positioned between and in spaced adjacency to each baffle member. Gas under pressure is discharged into the interior chamber of the bubble generator by a gas supply line attached to an externally located compressor. A well-formed, stable gas bubble created in the interior chamber of the bubble generator flows down a smooth upper surface portion of each baffle member and into the cone-shaped member which is in flow communiction with the stackpipe. The continual generation of well-formed, stable gas bubbles into the stackpipe propels the liquid material upwardly through the stackpipe and effects the circulation, mixing, and digestion of the contents. The generation of well-formed, stable gas bubbles is enhanced by mounting the gas bubble generator directly to the stackpipe and not letting the gas bubbles loose between the gas bubble generator and the stackpipe.

4 Claims, 12 Drawing Sheets

LIQUID CIRCULATING DEVICE

BACKGROUND OF THE INVENTION

This is a continuation-in-part of application Ser. No. 07/919,263, filed Jul. 27, 1992, and now abandoned.

The device of the present invention relates to the continuous circulation of a large body of liquid material, and more particularly pertains to a liquid circulating device for continuously circulating and mixing sewage sludge, thus facilitating the anaerobic digestion of the sludge to effect its safe treatment and disposal.

Over the last one hundred years, the collection, treatment, processing, and disposal of human waste has improved immeasurably from the practice of dumping raw sewage in streams, rivers, lakes, and poorly managed, poorly located landfills. Modern sewage treatment facilities include a number of complex steps, procedures and stations for the treatment and disposal of human waste.

The anaerobic digestion of human waste, i.e., substantially liquid sludge, is necessary in the treatment process. In order for anaerobic digestion of the sewage sludge to occur, the sludge must be continuously or batch-fed into large sealed digester or holding tanks, varying in size from 25 to 125 feet in diameter with 15 to 50 foot sidewalls. The size and number of each digester tank is dependent of the city or municipality being served; a 250,000 gallon digester tank is a common size, although holding tanks can range in size from 50,000 gallons to 2,000,000 gallons.

Essential to the circulation, mixing, and anaerobic digestion of the sewage sludge is the placement of some type of open-ended conduit, draft tube, or stackpipe inside the digester tank and submerged within the body of primarily liquid material, such as sewage sludge. In addition, some type of bubble generator is attached to and is in flow communication with the stackpipe. A gas supply line feeding into the bubble generator causes the continual creation of gas bubbles inside the bubble generator. The gas bubbles are then introduced into the stackpipe for propelling the liquid material up through the stackpipe, thus effecting continuous circulation, mixing, and digestion.

The sludge is derived from raw sewage which has been allowed to settle or thicken in other parts of the facility, and then pumped into the digester tank as the feedstock, i.e., the predominantly liquid sewage sludge. The sewage sludge itself contains 92–98% liquid-type material and 2–8% solids and has a thick, soupy consistency. The continuous mixing and circulation of the sewage sludge by the liquid circulating device breaks the sludge down and enables various kinds of microbes to feed upon and digest the sludge. The sludge is actually digested by acid-forming microbes, and the waste material of the acid-forming microbes is eaten by methane-forming microbes, which produce methane as a by-product. One measure of the performance of the digester tank is the amount of methane gas derived from the digestion process: according to specific chemistry formulas used industry-wide, for so many pounds of waste, at a given set of conditions, a proportionate number of pounds of a given substance will be produced.

Concomitant with the continuous or batch feeding of the feedstock into the digester tank, thoroughly digested sludge is being pumped out of the digester tank for further treatment and eventual disposal. Depending on whether the treatment facility serves industrial users or rural users, the treated sludge may be deposited in landfills or it can be recycled as fertilizer for farmland.

Representative of prior art liquid circulating devices are the three Lipert patents, U.S. Pat. Nos. 4,187,263, 4,293,506, and 4,356,131. U.S. Pat. No. 4,293,506 is a continuation-in-part of U.S. Pat. No. 4,187,263.

The Lipert U.S. Pat. No. 4,187,263 discloses a vertically-extending, open-ended stackpipe, a large bubble generator adjacent the stackpipe comprising a gas accumulator tank having an open bottom, a peripheral wall, and a top wall. A vertically-extending standpipe is positioned adjacent the bubble generator and the stackpipe, and allows the passage of liquid material therethrough. In addition, a T-pipe extends outwardly from the stackpipe and ends at a flared, downwardly-pointing frusto-conical opening. The open upper end of the standpipe is centered within the flared, frusto-conical opening of the T-pipe.

During operation of the Lipert device '263, gas is delivered into the gas accumulator tank by an inlet pipe. The gas pushes down the liquid sludge in the accumulator tank and also simultaneously lowers the sludge level in a bent pipe attached to, and in flow communication with, the standpipe and the gas accumulator tank. When the sludge reaches a certain predetermined level in the bent pipe and the gas accumulator tank, the gas is siphoned through the bent pipe into the standpipe, up through the transverse T-pipe and then upwardly through the stackpipe as a single large gas bubble. The upward movement of the gas bubble through the stackpipe pushes liquid sludge ahead of the bubble with a piston-like action upward and out the stackpipe upper end. The continual introduction of bubbles into the stackpipe causes the circulation of the liquid sludge through the stackpipe. Thus, the result is the continuous circulation, mixing, and digestion of the digester tank contents.

A number of factors and problems must be considered when designing and installing liquid circulating devices. The length of a stackpipe must be related to the volume and depth of the digester tank. A longer stackpipe provides better mixing because the bubble achieves greater momentum in its upward movement through the stackpipe. However, the longer the stackpipe, the more horsepower the compressor will require in order to generate the gas bubbles. Moreover, there is a physical relationship between the depth of the stackpipe and the compressor horsepower needed to generate the gas bubbles: the deeper the point at which the bubble enters the stackpipe, the more horsepower the compressor will require to generate that particular gas bubble.

In addition, the amount of bubbles cycling through the stackpipe at any one time depends on the length of the stackpipe, the depth the stackpipe is placed in the digester tank, and the bubble flow rate into the stackpipe. Each facility will have its own requirements based, in part, on the digester tank volume and the desired turnover rate of the feedstock.

Moreover, there is a trade-off between the gas pressure required to introduce the gas bubbles into the stackpipe and the rate of flow of the feedstock through the stackpipe. If the gas bubble generator is located high on the stackpipe, a lower pressure gas supply can be used, but an inadequate feedstock flow through the stackpipe will occur as well as the creation of malformed bubbles that may not fill the diameter of the stackpipe.

On the other hand, a gas bubble generator placed on the lower portion of the stackpipe will require gas supplied at a higher pressure and a compressor of greater horsepower, but a well-formed bubble will be generated as well as a greater flow rate and a more efficient mixing of the feedstock.

Also, the design of the liquid circulating device must consider the phenomenon known as ragging. Ragging is the term for pieces of fibrous material such as cloth, rags, hair, and fiber balls that clog and plug kitchen and bathroom drains. Ragging occurring in a liquid circulating device will internally clog parts of the device and obstruct the flow of liquid material therethrough, thus impeding the generation of properly formed gas bubbles into the stackpipe.

In the Lipert U.S. Pat. No. 4,187,263, there is a gap between the open upper end of the standpipe and the flared, frusto-conical opening of the transverse T-pipe that extends outwardly from the stackpipe. Ragging that occurs in this gap will impede the flow of gas bubbles or cause the gas bubbles to slip up the side of the stackpipe or down the side of the standpipe. Thus, the continuous circulation of the feedstock will be impeded and the performance of the liquid circulating device will be degraded.

These are some of the factors and problems that must be considered in the design and installation of liquid circulating devices for placement in a digester tank.

SUMMARY OF THE INVENTION

The apparatus of the present invention comprehends a liquid circulating device for submersion in a body of liquid material, such as sewage sludge, for producing a continuous circulation of the liquid material which causes the efficient mixing and digestion of the material.

The liquid circulating device includes an upright, elongated stackpipe and a gas bubble generator adapted for removable mounting to the stackpipe, the gas bubble generator being in flow communication with the stackpipe so that gas bubbles can be continually introduced into the stackpipe by the gas bubble generator. A gas supply means, such as a gas compressor, is located external to the liquid material contained within a holding tank, ranging in capacity from 50,000 to 2,000,000 gallons, and supplies gas under pressure into the gas bubble generator by a gas supply line. A support means is provided for securing the stackpipe to the floor of the holding tank. Alternatively, the stackpipe can be secured to the covering of the holding tank by a top-mounted support means.

The gas bubble generator includes an interior chamber into which the gas is discharged, the interior chamber also adapted to be filled throughout with the sewage sludge. The gas bubble generator has a substantially open bottom for allowing the sewage sludge to surge through and into the interior chamber completely filling the interior chamber when the gas bubble generator is submerged in the sewage sludge.

The gas bubble generator also includes a pair of oppositely-disposed, baffle members that extend transversely through the interior chamber. Each baffle member includes a smooth, upper rounded portion and a smooth upper surface portion, and further, each baffle member is a generally cone-shaped member which is attached to a vertical back plate of the gas bubble generator. The cone-shaped member has a lower opening and defines an inner vertical cavity which is in flow communication with the stackpipe. Secured to the lower opening is a smooth, rounded, bent, U-shaped bar which facilitates the unimpeded flow of the gas bubble under the bar, through the lower opening, and into and up through the vertical cavity, and thence into the stackpipe.

Mounted on the top plate of the gas bubble generator, and protruding therefrom, is an intermediate nozzle. The nozzle is adapted for removable attachment to a stackpipe opening and is in flow communication with the inner vertical cavity and the stackpipe. In addition, the nozzle is adapted for allowing passage therethrough of the gas bubbles from the vertical cavity of the cone-shaped member into the stackpipe.

It is an objective of the apparatus of the present invention to provide a gas bubble generator that facilitates the flow of gas bubbles into the stackpipe by having smooth, well-rounded structural components that assure minimum resistance to the flow of the gas bubbles so that each bubble exits the bubble generator as a single, large, well-formed bubble, capable of filling the diameter of the stackpipe.

Another objective of the apparatus of the present invention is to utilize the flow of the liquid to displace the bubble and propel it into the stackpipe. As the gas bubble flows down the smooth upper surface portion of either baffle member, the flow of liquid into the interior chamber of the gas bubble generator is guided in an exponentially contracting path and accelerates slightly as it follows behind the gas bubble, propelling the last of the gas bubble along each smooth upper surface portion so that it stays with the bubble proper.

Yet another objective is to provide a liquid circulating device that has a substantially open bottom which prevents solid material from obstructing the working of the gas bubble generator.

Still another objective of the apparatus of the present invention is to eliminate the phenomenon known as ragging by mounting the gas bubble generator directly to, and in flow communication with, the stackpipe.

A further objective of the apparatus of the present invention is to generate uniform, well-formed, stable, cohesive gas bubbles into the stackpipe, the bubbles filling the diameter of the stackpipe because of the shape and size of the internals, i.e., the structural components located within the gas bubble generator.

It is yet another objective of the apparatus of the present invention to provide sufficient surface mixing in order to break up the floatables (grease, scum, etc.) that can accumulate on the surface of the liquid body: such accumulation on the surface forms a scum blanket. The scum blanket prevents the efficient and thorough mixing and digestion of the liquid material; the present invention provides sufficient energy from the gas bubbles and the liquid material exiting the stackpipe to break up the scum blanket and prevent its formation.

The various features and advantages of the present invention will become more apparent from the accompanying drawings and the following verbal descriptions of preferred embodiments of the present invention. The descriptions, drawings, and the following examples, are given to merely show preferred examples of the present invention and are not intended to be exclusive of the scope thereof.

DETAILED DESCRIPTION OF THE PREFERRED EMBODIMENT

As illustrated in FIGS. 1–4, a preferred embodiment is shown of a liquid circulating device 10 for placement within a large holding or digester tank filled with a body of predominantly liquid material 12. The device 10 of the present invention is adapted for processing the material 12, such as sewage sludge, for environmentally safe disposal. In addition, the device 10 is designed to generate a continuous circulation of the material 12 in order to thoroughly mix and digest the material 12. Also, the apparatus of the present invention is adapted for submersible placement in a holding or digester tank (not shown) containing sewage sludge in order to facilitate the anaerobic digestion of the contents contained within the tank. The device 10, in effect, works as a physical pump or a draft tube. The continuous circulation of the material 12 causes the destruction of volatile solids, thus mixing the material 12 and breaking it down so that various types of microbes living in the material 12 can feed upon and consequently digest the material 12. Various types of gases, such as methane gas, are by-products of the process of anaerobic digestion.

Figure 1:
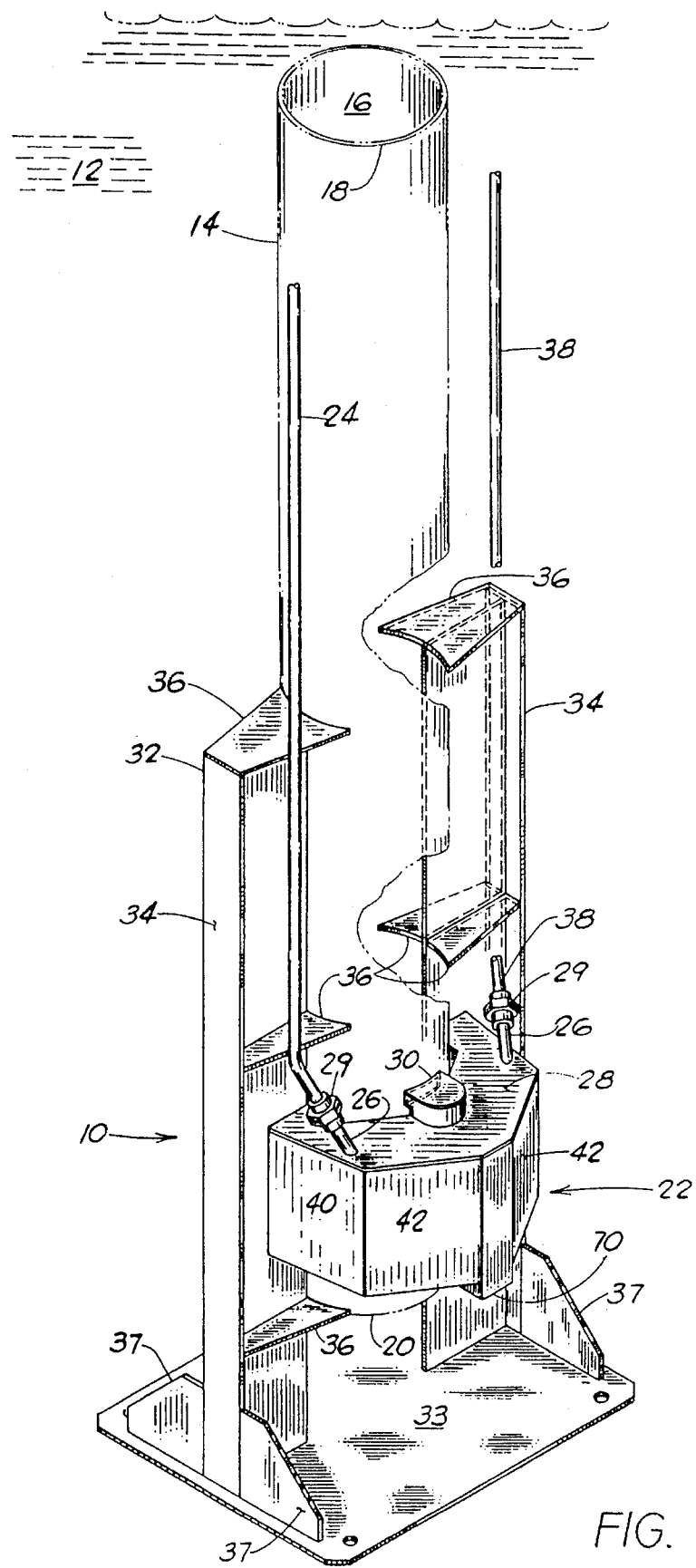
FIG. 1 is an isometric view of the liquid circulating device of the present invention, illustrating the stackpipe, the bubble generator, and other structural components.
Figure 4:
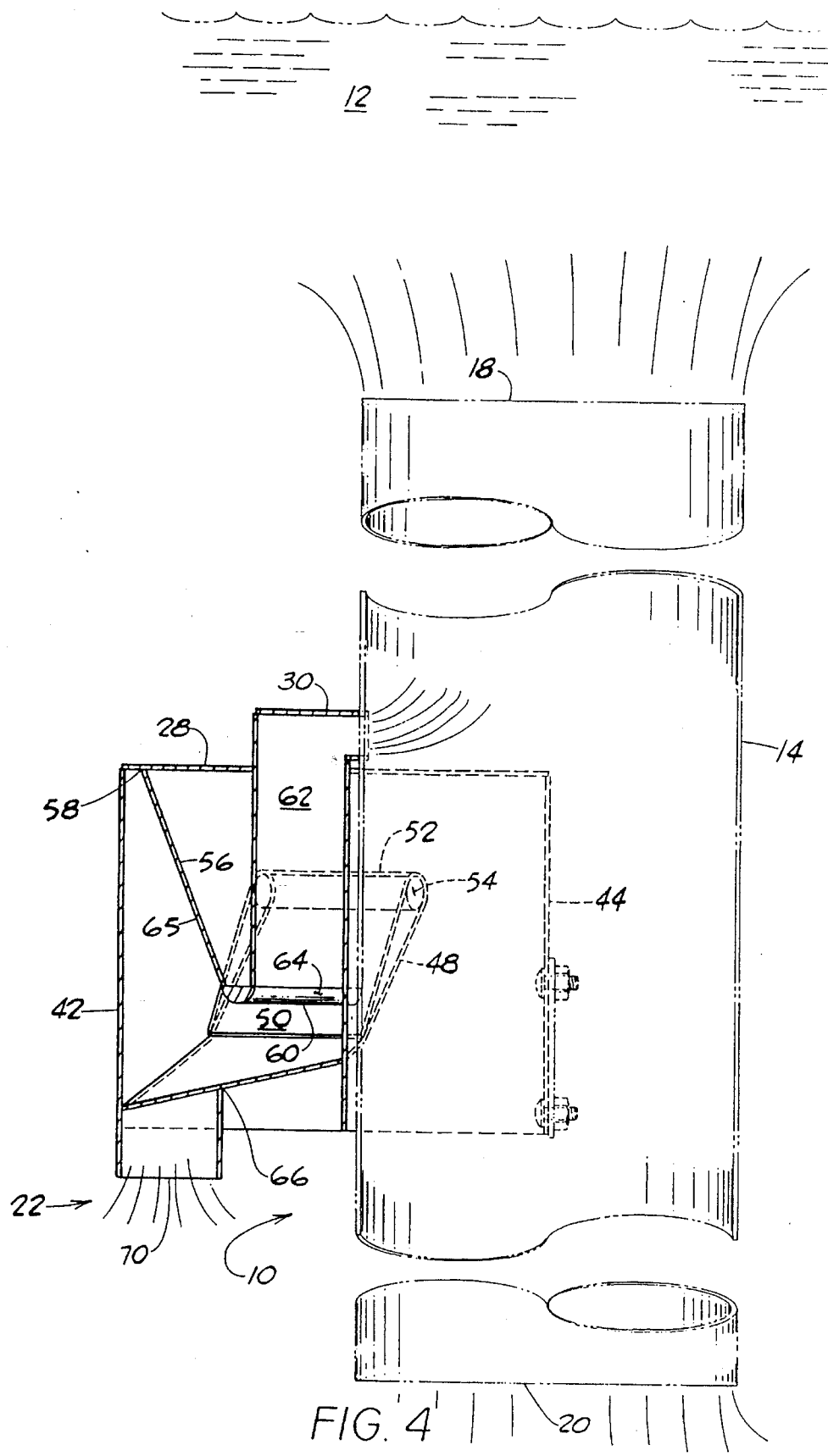
FIG. 4 is a sectional elevational view of the liquid circulating device taken along line I—I of FIG. 3.

Referring to FIGS. 1 and 4, the device 10 includes a vertically-elongated, cylindrical, upright stackpipe 14, which is submersibly placed in the holding tank. The stackpipe 14 may have a height of up to 65 feet and is constructed of a durable steel material. In order to better resist corrosion due to the chemical reactions that occur in the sewage sludge, the stackpipe 14 may be composed of two percent bronze. Throughout the vertical length of the stackpipe 14 there is defined a hollow stackpipe passageway 16 which terminates at an upper open egress end 18 and at an oppositely-disposed lower open ingress end 20. As will be more fully explained hereinafter, the material 12 flows into the passageway 16 of the stackpipe 14 through the ingress end 20, and exits the passageway 16 through the egress end 18. Although not shown in any of the figures, the stackpipe 14 also includes an opening located on the side of the stackpipe 14.

Figure 3:
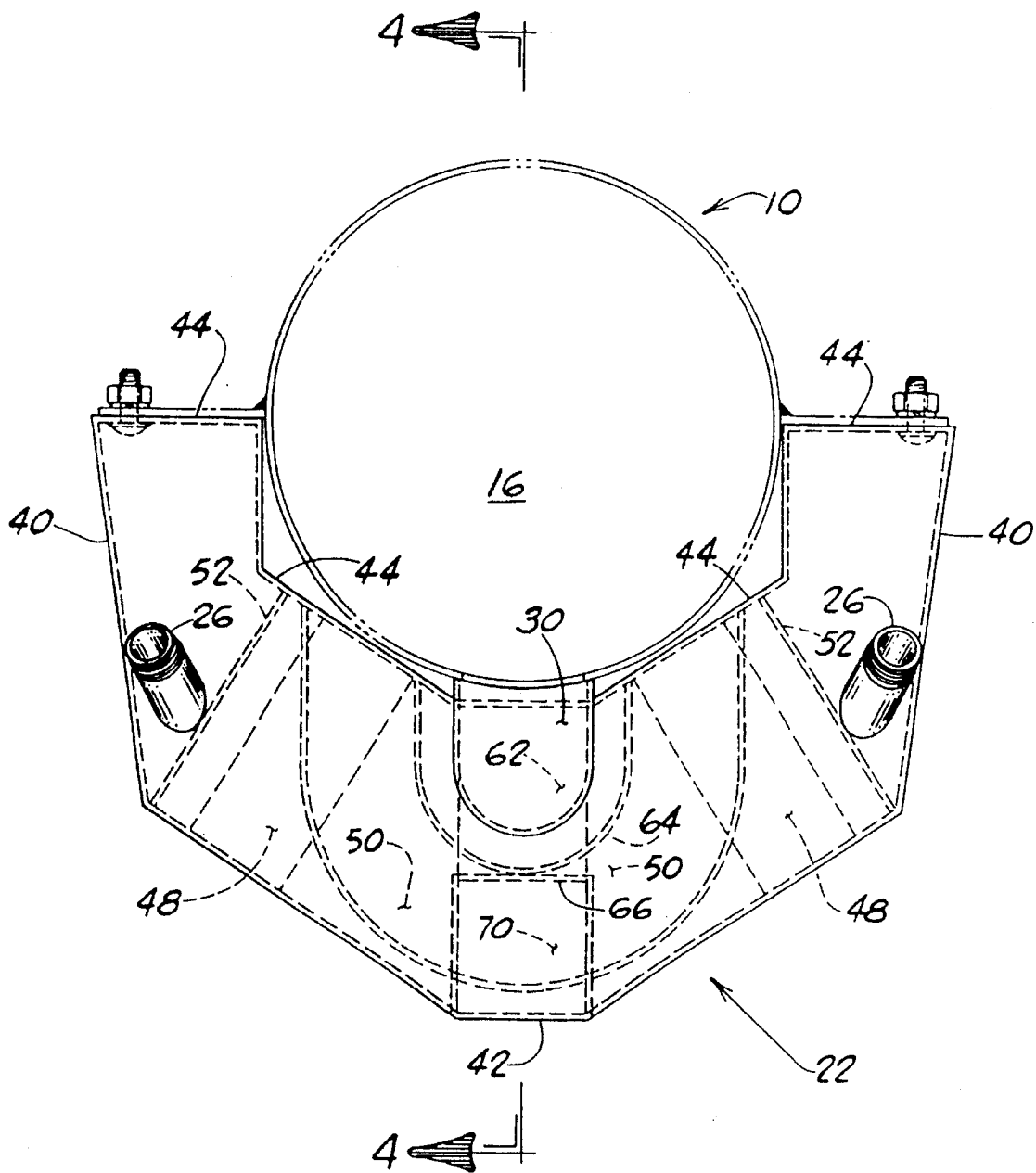
FIG. 3 is a top plan view of the liquid circulating device first shown in FIG. 1.

The device 10 includes a gas bubble generator 22 which is secured or mounted to the side of the stackpipe 14 and is in flow communication with the stackpipe opening and the stackpipe passageway 16. The generator 22 is adapted to be removably securable to the side of the stackpipe 14. The generator 22 may be described as generally polyhedron-shaped; FIG. 3 illustrates how the generator 22 is designed to partially conform to the cylindrical stackpipe when the generator 22 is mounted thereto.

The primary structural component of the device 10 is the generator 22, which is adapted for continually generating gas bubbles and introducing the gas bubbles into the passageway 16. Once the gas bubbles are introduced into the passageway 16, their upward momentum causes the liquid material 12 above the bubbles to be propelled up through the stackpipe 14. The generator 22 is adapted to continually introduce gas bubbles into the passageway 16 of the stackpipe 14, thus causing the continuous circulation and mixing of the sewage sludge contained within the holding tank.

Located external to the holding tank is a gas supply means, such as the gas compressor (not shown), for supplying gas at a predetermined pressure to the generator 22. The compressors are rated in SCFM (14.7 psi and 60° F.), and the size of the compressor is dependent upon such factors as the volume of liquid material in the holding tank, the turnover rate of the liquid material as desired by plant specifications, and the depth at which the generator 22 is mounted to the stackpipe 14. Furthermore, the pressure is also determined by the hydrostatic head of the liquid 12 above the generator 22. The gas volume is inversely proportional to the absolute pressure. For example, for a bubble generator located 34 feet below the surface of the liquid material the gas volume flow rate (ACFM) will be one-half the SCFM. At 20 feet below the surface the ACFM will be 34/(34+20) or 0.63 cubic foot per minute for each SCFM delivered by the compressor. As illustrated in FIG. 1, the gas is discharged through a gas supply line 24 which extends down into the holding tank and is attached to a connection member, the connection member in turn is attached to, and in flow communication with, the generator 22.

Figure 2:
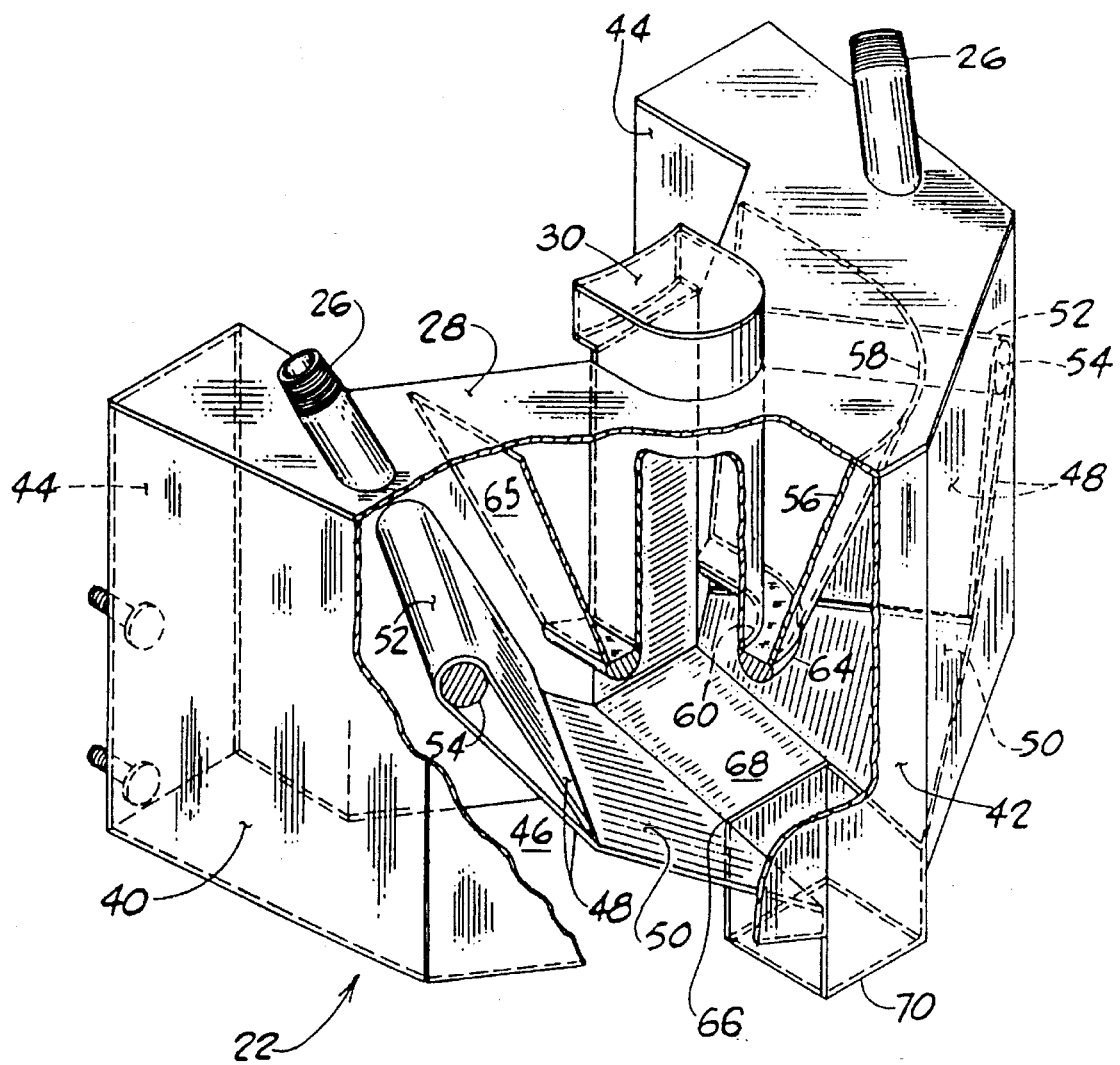
FIG. 2 is an enlarged isometric view of the bubble generator first shown in FIG. 1, with a portion of the bubble generator cut away to reveal internal structural components.

As shown in FIGS. 1, 2, and 3, the apparatus of the present invention includes two gas supply line connection members 26. More specifically, each gas supply line connection member 26 is secured to a flat top plate 28 of the generator 22. The line 24 is attached to, and in flow communication with, one of the connection members 26, and each connection member 26 is in flow communication with the generator 22, as shall be more fully described hereinafter. A threaded coupling 29 may be used to attach the line 24 to the connection member 26. An intermediate nozzle 30 mounted on the top plate 28 of the generator 22 is adapted for sealable attachment to the stackpipe opening. The nozzle 30 allows passage therethrough of the gas bubbles and the sewage sludge from the generator 22 through the stackpipe opening and into the stackpipe passageway 16.

A support means is necessary for securing the stackpipe 14 to the floor of the holding tank. The support means may be for either top supporting or bottom supporting; in the apparatus of the present invention the stackpipe 14 is bottom supported. The support means for the device 10 includes a pair of oppositely-disposed, upright column supports 32 secured to the stackpipe 14, and a base plate 33 adapted for removable securement to the floor of the holding tank, with one support 32 secured to one side of the stackpipe 14, and the other support 32 secured 180° to the opposite side of the stackpipe 14. Each column support 32 includes a vertically-extending upright member 34 which is spaced from the stackpipe 14 and a plurality of spaced-apart, flat horizontal plates 36 having a first plate end attached to each upright member 34 and a second plate end attached to the side of the stackpipe 14. Each plate 36 is comprised of two half portions as shown in FIG. 1. The lowest horizontal plate 36 is attached to the stackpipe 14 parallel to the lower end 20 and the topmost horizontal plate 36 may be attached at a point generally halfway up the stackpipe 14, the topmost plate 36 also defining the top of each column support 32. The generator 22 is mounted to the side of the stackpipe 14 adjacent each column support 32. In addition, each support 32 may include a vertically-extending web member which extends the height of each column support 32 and is located between each half portion of each horizontal plate 36. A pair of generally triangular-shaped gusset plates 37 are attached to each upright member 34 and have a horizontal edge contiguous to the base plate 33.

A rodding line 38, as shown in FIG. 1, may also be included with the device 10. If the rodding line 38 is included, it would be secured to either of the connection members 26, and in flow communication with the generator 22. The rodding line 38 has a first end which can be attached to an externally located compressor and a second end which would be attached to either of the gas supply line connection members 26. The rodding line 38 would extend adjacently therealong the stackpipe 14 in several different ways (not shown). The rodding line 38 would be used to blow out and remove pluggage from the generator 22, and would be manufactured from, for example, a two-inch diameter stainless steel pipe. The rodding line 38 removes pluggage by introducing a substance under high pressure, such as water or steam, into the generator 22. Pluggage occurs due to a phenomenon known as ragging: the accumulation of fibrous materials (hair and fiber balls of the kind that clog ordinary household sinks and drains) inside the generator 22.

In addition, the apparatus of the present invention could include a heating jacket (not shown in any of the figures) which would be adapted for removable placement around the stackpipe 14, generally above the generator 22 and the column supports 32. The purpose of the heating jacket would be to sustain the various types of microbes at a constant temperature of generally between 92° and 96° in the material 12, and especially in the material 12 circulating through the stackpipe 14. The heating jacket may include a split, two-pass pipe that conducts heat to the material 12 in the stackpipe 14 so that the aforestated temperature range can be maintained at the optimum temperature within which the microbes can flourish.

As illustrated in FIGS. 1 through 4, the primary structural component of the apparatus of the present invention is the generator 22. The generator 22 includes a number of structural features which facilitate the creation of stable, well-formed, cohesive bubbles which exhibit a high degree of integrity for introduction into the passageway 16 of the stackpipe 14, the gas bubbles being generally uniform in size and filling the diameter of the stackpipe 14. In order to generate optimum flow of the material 12 through the stackpipe 14, the generator 22 should be mounted near the bottom quarter of the stackpipe 14. The further up on the stackpipe 14 that the generator 22 is mounted, the more likelihood there is of the generation of malformed bubbles. Such bubbles will be unable to fill the stackpipe 14 diameter to provide sufficient upward momentum to produce adequate flow of the material 12 through the passageway 16. However, the lower down on the stackpipe 14 the generator 22 is mounted, the more momentum the bubble will have as it flows upward through the passageway 16 of the stackpipe 14. Consequently, a greater flow of the material 12 through the stackpipe 14, and a more efficient mixing of the contents, i.e., the sewage sludge, will result. But the deeper and lower on the stackpipe 14 the generator 22 is mounted, the more horsepower the compressor will require and the higher the energy generating costs will be.

As shown in FIGS. 1, 2, and 4, the generator 22 includes the flat top plate 28, a pair of oppositely-disposed, vertical sidewalls 40 that are contiguously attached at their top plate 28, and a face plate 42 which can be adapted for either permanent or contiguous removable securement to the generator 22 along a forwardly-facing, vertical edge of each sidewall 40 and along a forward edge of the top plate 28. Each connection member 26 is attached to the top plate 28 adjacent one of the peripheral edges of the top plate 28. Furthermore, each connection member 26 is attached to the top plate 28 at an angle, 60° being one preferred angle, for discharging the gas into the generator 22. A vertically-extending back plate 44 shaped to partially encompass the stackpipe 14, as illustrated in FIG. 3, is attached to a rear horizontal edge of the top plate 28 and a rearwardly-facing vertical edge of each sidewall 40. When the generator 22 is mounted to the stackpipe 14, the back plate 44 is positioned adjacent to, and in partial contact with, the stackpipe 14.

The generator 22 further defines an interior chamber 46, as shown in FIG. 2, which has a substantially rectangular, vertical cross-sectional area, the interior chamber 46 being enclosed by the top plate 28, each vertical sidewall 40, the face plate 42, and the back plate 44. When the generator 22 is disposed in its operative position of being mounted to the stackpipe 14 in the body of the material 12 contained within the holding tank, the interior chamber 46 is filled throughout by the material 12. In addition, the chamber 46 receives the pressurized gas as the gas is discharged and introduced therein from one of the connection members 26.

As shown in FIGS. 2, 3, and 4, the generator 22 also includes a pair of spaced-apart, oppositely-disposed, angled baffle members 48 that are secured to the back plate 44 and the face plate 42 and extend transversely across the chamber 46. Each baffle member 48 slopes downward toward the other baffle member 48. Also, each baffle member 48 includes a smooth upper surface portion 50 which facilitates the unimpeded flow of the material 12 and the gas bubbles therealong and into the stackpipe 14, as will be more fully described hereinafter. In addition, each baffle member 48 includes a transversely-extending, upper rounded portion 52 that is also adapted to facilitate the smooth flowing movement of the gas bubble over each respective rounded portion 52 and downward along each surface portion 50. Each rounded portion 52 is continguous to each respective surface portion 50.

The baffle members 48 may be constructed from a unitary piece of rolled steel material, as shown in FIGS. 2, 3, and 4, and each rounded portion 52 is integrally formed therefrom. Each baffle member 48 overlaps and is wrapped around a cylindrical bar 54 that extends transversely through the interior chamber 46 and is attached to the back plate 44 and the face plate 42, and each bar 54 is contiguous to an inner curved surface of each rounded portion 52. The bars 54 provide stability and support for the rounded portion 52 of each baffle member 48. Furthermore, as shall be more fully described hereinafter, the baffle members 48 can be variously positioned within the generator 22 to provide maximum acceleration of the material 12 as it flows downwardly along the surface portion 50 following behind the gas bubbles.

As illustrated in FIGS. 2 through 4, attached to the back plate 44 and the top plate 28, and projecting into the chamber 46, is an angled, generally cone-shaped member 56. The member 56 includes a half-circle, upper, rounded peripheral edge which is contiguous to the top plate 28 and adjacent to the face plate 42. The member 56 includes a generally U-shaped lower opening 60 and an inner, elongated, vertical cavity 62. The cavity 62 is in flow communication with the nozzle 30 that is mounted on the top plate 28, and is also in flow communication with the chamber 46.

As illustrated in FIG. 2, each baffle member 48 is located to either side of, and in spaced adjacency to, the member 56, and each surface portion 50 of each baffle member 48 extends downwardly adjacent along the side and partially beneath the cone-shaped member 56. A half-rounded, substantially U-shaped bar 64 is attached to, and adapted to conform with, the opening 60 of the member 56. The bar 64 has a smooth surface which is adapted to facilitate the smooth, unimpeded flow of material 12 and gas bubbles thereunder and into the cavity 62. The member 56 receives gas bubbles and material 12 through the opening 60 and thence into the cavity 62 whereupon the material 12 and the gas bubbles flow through the nozzle 30 and into the passageway 16 of the stackpipe 14. The bar 64 assures minimum resistance to the gas bubbles as they leave the chamber 46, and, thus, each bubble leaves the generator 22 as a single, large, well-formed bubble.

Furthermore, the cavity 62 defines a vertical axis which is parallel to the vertical axis defined by the passageway 16 of the stackpipe 14. The member 56 also includes a downwardly and inwardly sloping smooth exterior surface 65, as illustrated in FIGS. 2 and 4, and which encloses the cavity 62, and is disposed at an angle of between 20° and 70° with respect to the vertical axis of the cavity 62. The aforestated range for the slope of the exterior surface 65 has been found to best facilitate the smooth and rapid discharge of the gas bubbles into the passageway 16 of the stackpipe 14. In addition, the exterior surface 65 also facilitates the rapid and smooth flowing movement of the gas bubbles as they flow down the surface portion 50 of the baffle members 48. Moreover, the distance between each baffle member 48 and the adjacent portion of the exterior surface 65 of the member 56 assists in forming or shaping the gas bubbles by restricting the area of travel for the gas bubbles. The distance between each surface portion 50 and the exterior surface 65 also facilitates the formation of gas bubbles exhibiting a high degree of integrity (cohesion).

As illustrated in FIGS. 2, 3, and 4, the preferred embodiment of the apparatus of the present invention includes a rectangular-shaped tail member 66 which is located generally beneath the member 56 and between each baffle member 48. The tail member 66 extends from the back plate 44 to the face plate 42. The lowest portion of each surface portion 50 of each baffle member 48 abuts and terminates at the tail member 66. The tail member 66 includes a downwardly-sloping flat member 68 disposed adjacent and beneath the lower opening 60 and the bar 64 of the cone-shaped member 56, and a square-shaped, vertically-extending member 70 which is adapted for allowing the passage of material 12 into the chamber 46 and the member 56, and is located between the flat member 68 and the face plate 42. More specifically, the lowest portion of each surface portion 50 is attached to the flat member 68 and the sides of the square-shaped member 70. As illustrated in FIGS. 2 and 3, a smooth contiguous surface is formed, starting from the rounded portion 52 on the left-hand side of the baffle member 48, continuing down along the surface portion 50 to the flat member 68, thence along and up the surface portion 50 on the right-hand side of the baffle member 48, and finally to the rounded portion 52. The flat member 68 is located generally underneath and adjacent to the opening 60 of the member 56 and slopes downward from the back plate 44 toward the face plate 42.

In operation, the device 10 is submersibly placed in the holding tank filled with the material 12, such as sewage sludge. The number of liquid circulating devices placed within the holding tank are dependent on such factors as the desired turnover rate for the sewage sludge and the circulation that is required for that particular turnover rate. The externally located compressor discharges gas, such as methane gas, at a pre-determined pressure through the line 24 and the respective connection member 26 and into the interior chamber 46, whereupon the gas enters as a continual stream of gas bubbles. It is quite common in many municipal sewage treatment facilities that the gas used is recycled sewage gas, i.e., a mixture of methane and $CO_2$. Also, nitrogen can be used as well as oxygen. The gas used to create the bubbles is tailored for the constituent compounds and elements comprising the material to be mixed and digested. The substantially open bottom of the generator 22 allows the material 12 to suffuse the interior chamber 46. As the gas enters the chamber 46, the gas pushes down the material 12 within the chamber 46, forming a gas bubble, which starts to flow over the rounded portion 52 and down the surface portion 50 of one of the baffle members 48. The gas bubble will get larger because, as the pressure goes down in the chamber 46, according to the formula PV/T, the area in which the gas bubble can expand increases.

When the gas pushes the material 12 to a point immediately below the bar 64, the gas is rapidly siphoned out through the cavity 62 and the nozzle 30, and into the passageway 16 of the stackpipe 14 as a large, stable, cohesive gas bubble. The material 12 following the gas actually accelerates as it flows smoothly in an exponentially contracting path over the rounded portion 52, downwardly along the surface portion 50, and under the bar 64 of the member 56, and assists in pushing the last of the gas along so that it stays with the gas bubble proper. The surface portion 50 provides less friction resistance to the gas as it flows therealong and, therefore, the gas travels in a smooth, flowing movement. When the material 12 has been pushed down by the gas to the point immediately below the lower opening 60 and the bar 64, the gas breaks over the smooth rounded edge of the bar 64 and is rapidly siphoned out of the chamber 46 and up through the cavity 62 of the member 56. The surface tension between the gas bubble and the surrounding material 12 helps to maintain the stable and cohesive form of the gas bubble as it travels up the cavity 62, through the nozzle 30, and into the passageway 16 of the stackpipe 14.

Depending on the desired pumping rate for generating circulation through the stackpipe 14, gas bubbles can be introduced into the passageway 16 each second to every three seconds. The volume of the material 12 that is above the opening 60 divided by the actual gas rate (ACFM) represents the gas bubble time rate. For example, if the gas rate is 30 ACFM and the generator 22 of the present invention has a volume of 1.2 cubic feet, then a gas bubble will release every 1.2/30 minutes, or every 2.4 seconds.

As the gas breaks under the bar 64 and releases up into the cavity 62, the material 12 is also flowing upward and through the member 70. The member 70 restricts the flow of the material 12 upward into the chamber 46, but also assists in pushing the gas bubbles up through the cavity 62 by flowing into the path of the gas bubbles. At least one gas bubble is moving upward in the passageway 16 at any given time, and the gas bubble generated will fill the diameter of the stackpipe 14.

The generator 22 of the present invention is designed to avoid the phenomenon known as motoring which is the creation of a continuous stream of small bubbles which enter the passageway 16 but do not completely fill the diameter of the stackpipe 14, and, moreover, are unstable, poorly-formed gas bubbles which are unable to propel the material 12 up through the stackpipe 14 to effect proper mixing and circulation. Motoring is also caused by a too rapid fillup of gas bubbles in the generator 22. The aforedescribed internal structural components of the generator 22 of the present invention enhance the creation of a continual stream of stable, cohesive, well-formed gas bubbles.

In addition, another advantage of the generator 22 of the present invention is that it avoids letting gas bubbles loose in the chamber 46. As the gas is discharged and introduced into the chamber 46, the rounded portion 52 and the surface portion 50 of each baffle member 48 directs the movement of the gas bubbles therealong and towards the opening 60. Thus, the shape of internal structural components of the generator 22 and the flow of material 12 following behind the gas bubbles maintains the cohesion of the gas bubbles and directs them through the opening 60 and up into the cavity 62 of the member 56.

This is in contrast to the structure of other types of bubble generators which by their design, for example, permit the gas bubble to slip up the side of the stackpipe. Once the gas bubble created by the generator 22 of the present invention enters the passageway 16 it is shaped by the material 12 on top of it. The gas bubble formed by the generator 22 forms a stable meniscus which propels the material 12 on top of it up through the stackpipe 14, thus effecting the efficient and continuous mixing and circulation of the material 12. As the well-formed gas bubble propels the material 12 up through the stackpipe 14, a vacuum is created between the upwardly-moving gas bubble and the material 12 beneath it in the stackpipe 14. However, the downward pressure from the surrounding material 12 in the holding tank causes this area to be immediately filled by material 12 entering through the end 20; the material 12 is generally drawn from a sphere of influence between roughly ten to fifteen feet in circumference around the lower end 20 of the stackpipe 14.

When immersibly placing the stackpipe 14 with the generator 22 mounted thereto in the holding tank, several other factors must be taken into account. Since there may be six inches of silt on the floor of the digester tank, the lower end 20 must be a sufficient distance above the floor to insure the proper, continuous and unimpeded flow of material 12 into the lower end 20. In the apparatus of the present invention, the stackpipe 14 is located so that the lower end 20 is above the floor of the holding tank a distance equal to at least one diameter of the stackpipe 14. Therefore, the height above the floor of the digester tank should be at least equal to the stackpipe diameter plus six inches.

Another factor to be considered when immersibly placing the stackpipe 14 in the material 12 is the necessity for getting a proper surface mix. If the surface mixing of the material 12 is inadequate, a build-up or scum blanket will form on the surface of the material 12 within the holding tank, the build-up consisting of a large cake of accumulated grease and scum which are referred to in the industry as floatables. A relatively violent agitation of the body of the material 12 is required in order to break up the scum blanket consisting of the floatables in order to prevent the various types of microbes from simply eating off the bottom of the large cake and never completely digesting the contents of the scum blanket.

The scum blanket may be up to two or three feet thick and cover the entire surface of the body of material 12. In order to break this up, the continual stream of gas bubbles exiting the end 18 should have enough pressure to strike and break up the scum blanket, i.e., the floatables. The kinetic energy of the material 12 and the gas bubbles leaving the passageway 16 dissipates when it reaches the surface of the material 12 and is transferred to the scum blanket, thereby breaking it up. Therefore, the stackpipe 14 is placed within the material 12 so that the egress end 18 is located below the surface of the material 12 a distance at least equal to the diameter of the stackpipe 14 to assure that the kinetic energy is transferred to the scum blanket in order to break it up. If the egress end 18 is located too close to the surface of the material 12, the kinetic energy will dissipate by pushing the material 12 above the surface. If the egress end 18 is located too far away from the surface of the material 12, the kinetic energy of the gas bubbles and the material 12 will be insufficient to break up the scum blanket. Thus, by locating the egress end 18 in the aforedescribed position, the gas bubbles and the material 12 will exit the egress end 18 with enough pressure to break up the scum blanket.

Referring to FIGS. 5–12, there are shown several further improvements of the generator 22. The purpose of these further improvements is to improve the fluid dynamics of the gas bubble as it transfers or interfaces between the generator 22 and the stackpipe 14. The structural features which will be hereinafter described are improvements which increase the system efficiency and thereby both increase the pumping rate and reduce the energy use of the device 10.

Figure 5:
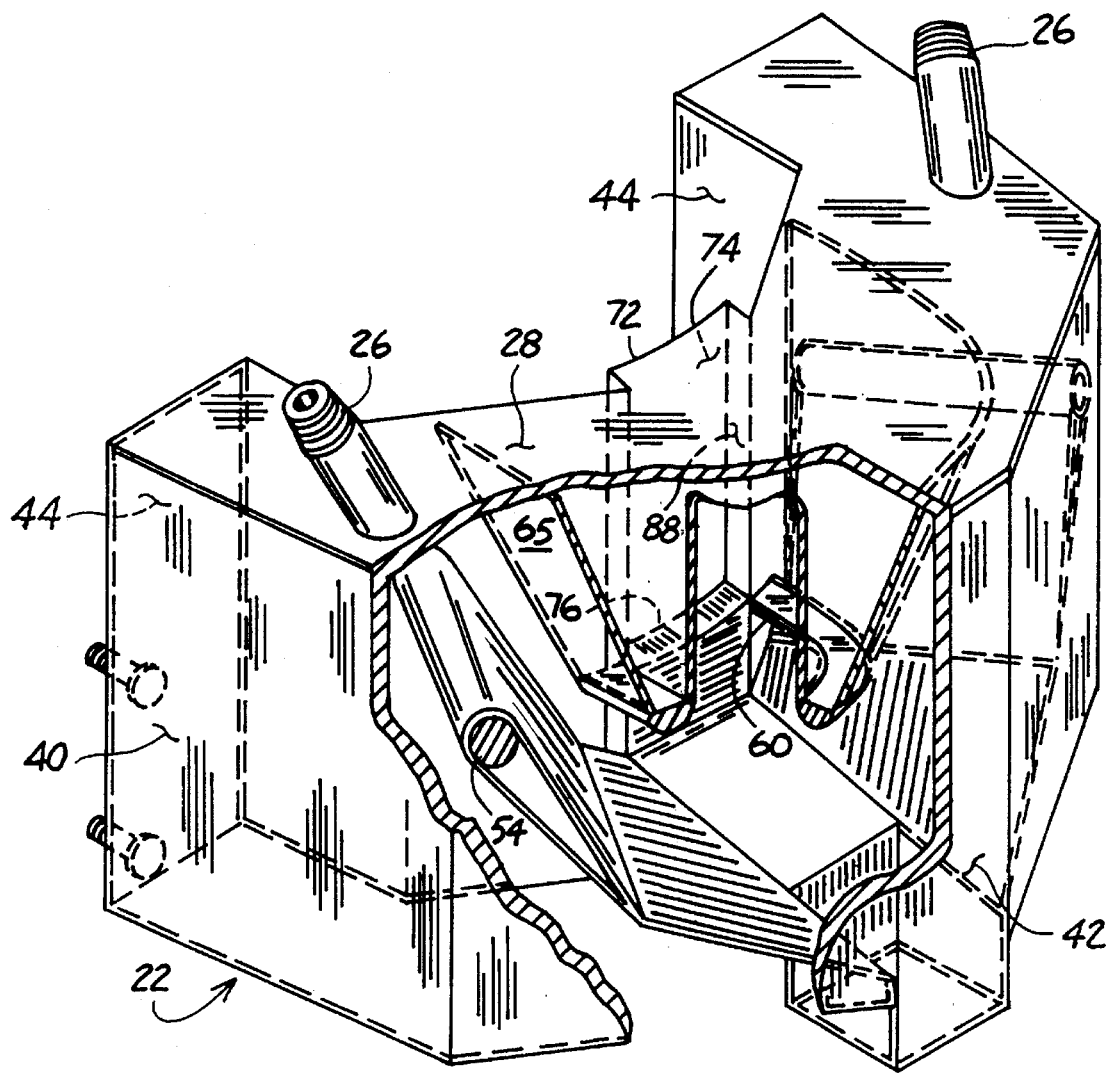
FIG. 5 is an enlarged isometric view of an alternate embodiment of the bubble generator first shown in FIG. 1.
Figure 6:
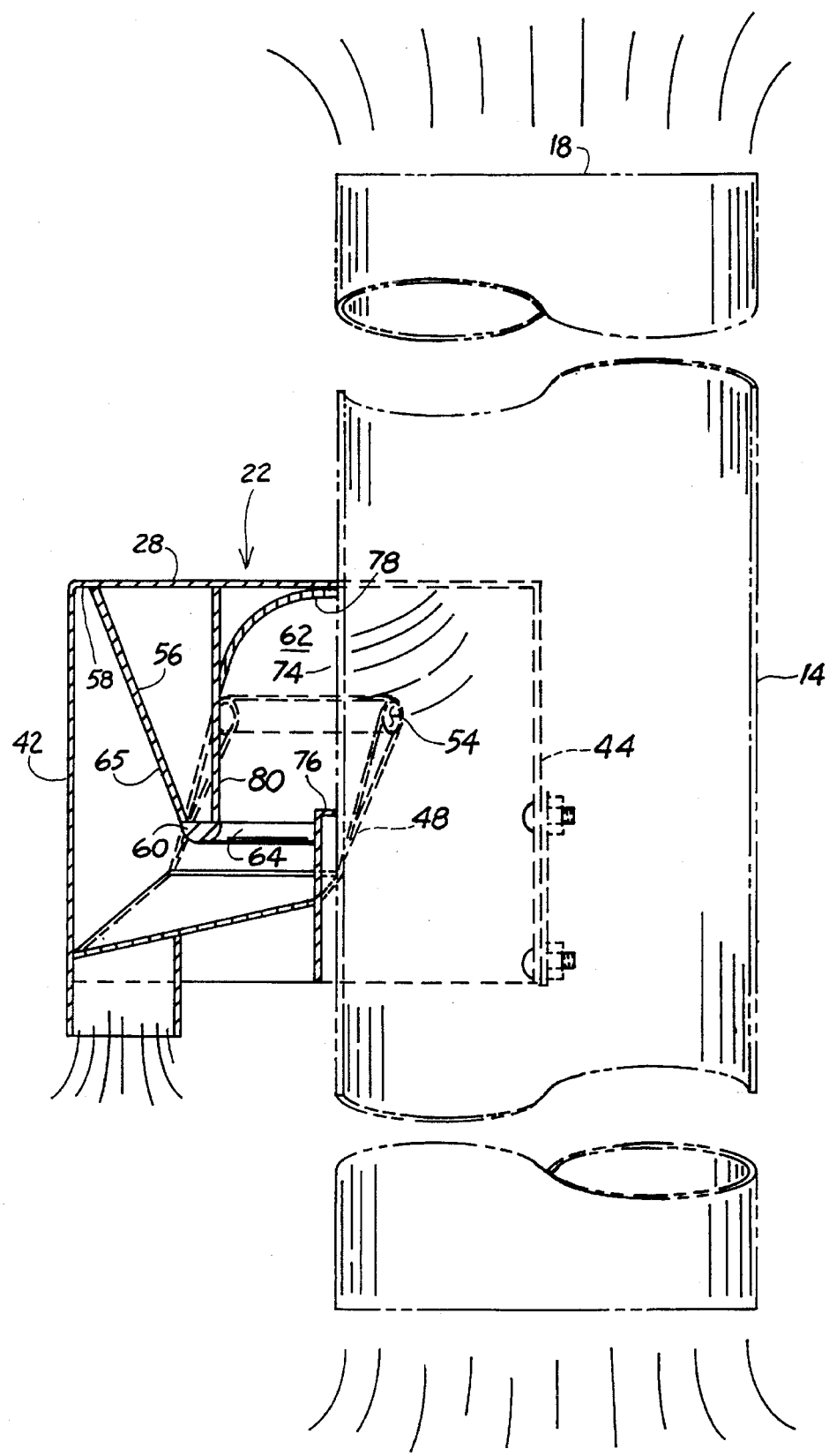
FIG. 6 is a sectioned elevational view of the bubble generator shown in FIG. 5, and including the stackpipe.
Figure 7:
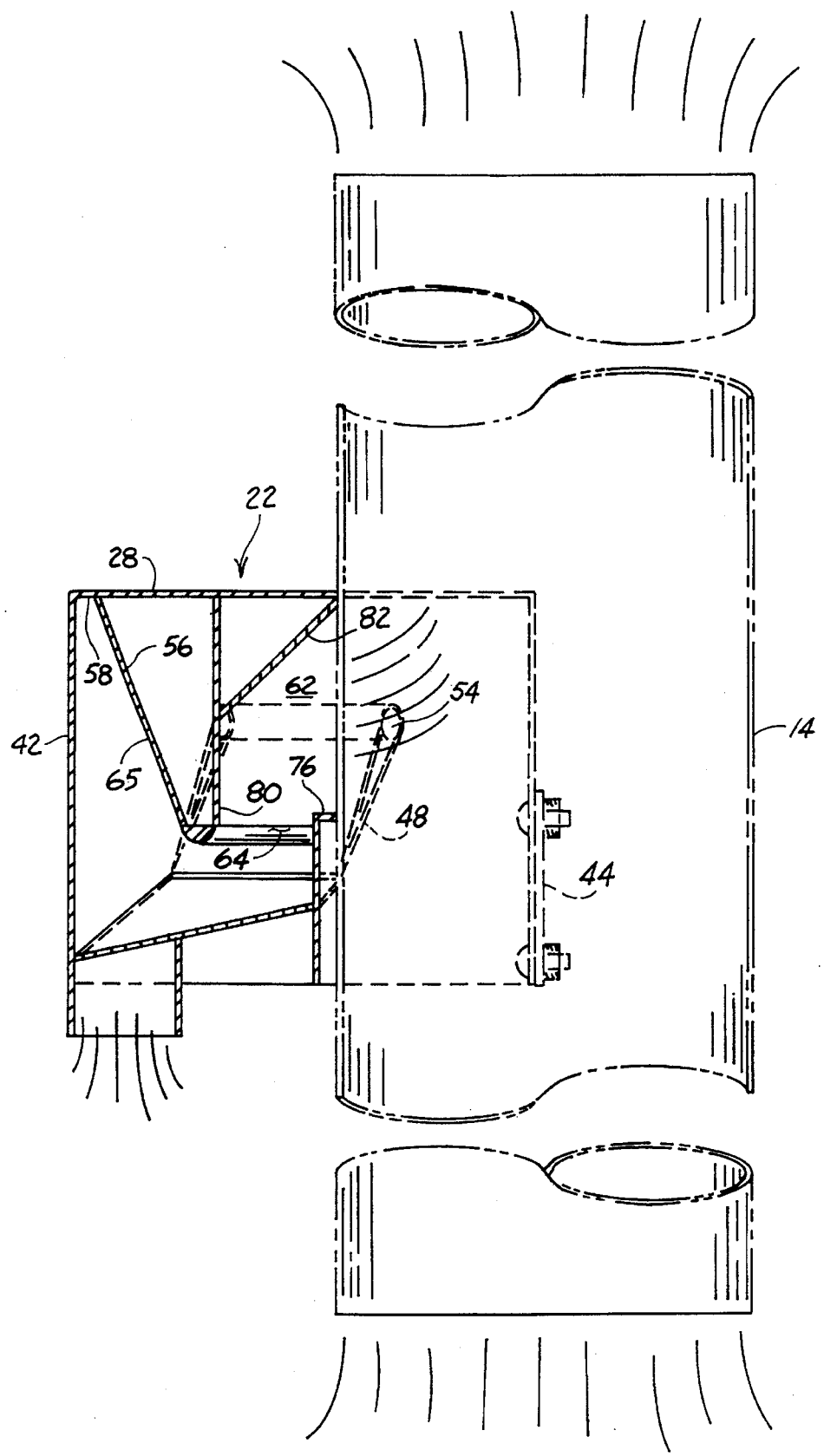
FIG. 7 is a sectioned elevational view of the bubble generator first shown in FIG. 6, illustrating a flat plate disposed within the inner vertical cavity of the bubble generator.

As shown in FIGS. 5–7, the nozzle 30 has been removed and the top plate 28 is level and serves as the top flat surface for the cavity 62. In addition, a portion of the back plate 44, adjacent the cavity 62, is extended or projected outwardly for fitting to the stackpipe 14. A back plate attachment lip 72 protrudes outwardly from the back plate 44 and is curved at its topmost portion which is formed from the plate 28 to conform to the curvature of the stackpipe 14. When the generator 22 is attached to the stackpipe 14, the curvature of the lip 72 conforms to the stackpipe 14 for an airtight and watertight securement of the generator 22 to the stackpipe 14.

As shown in FIGS. 5–7, in place of the nozzle 30, which in the preferred embodiment shown in FIGS. 1–4 is in flow communication with the stackpipe 14, an elongated aperture or slot 74 is cut out of and runs down from the plate 28 so that a bottom shoulder or ledge 76 of the slot 74 is flush with the U-shaped bar 64 and the slot 74 is thus slightly shorter in vertical length than the member 56. A corresponding slot (not shown) on the stackpipe 14 mates or aligns with the slot 74, and is coequal in length therewith, so that gas bubbles and material 12 can flow from the cavity 62 through both the slot 74 and the stackpipe slot and then up through the stackpipe 14. If the ledge 76 were lower than the bar 64 the gas bubbles would just escape out of the slot 74 as malformed bubbles without flowing under the bar 64. The slot 74 is cut out from the back plate 44, and the lip 72 is formed during the manufacture of the back plate 44.

The slot 74 of FIGS. 5–7 makes for a less restricted flow of the gas that forms the bubbles. With the use of the slot 74, the bubbles more quickly form a spherical or bullet shape for improving the efficiency of the generator 22, both by pumping more material 12 through the stackpipe 14 and by using less energy to do so. The bubbles start to shape earlier, and this leads to faster and better bubble development.

FIGS. 6 and 7 illustrate structural features which facilitate ease of transfer of the bubbles into the stackpipe 14 to avoid the bubbles rising at a right angle to the top plate 28 and then bouncing off the plate 28 immediately above the cavity 62 and placed at a 45° angle. The plates 78 and 82 assist the bubbles in maintaining their integrity so that the bubbles have increased momentum as they exit the cavity 62. With the nozzle 30 of FIG. 3, the bubbles rise up in the cavity 62 and strike the top flat surface of the nozzle 30 before exiting the generator 22. Utilizing the curved plate 78 or the flat plate 82 avoids the energy loss caused by the upwardly moving bubbles abruptly having to change their direction as they enter the passageway 16 of the stackpipe 14.

Figure 8:
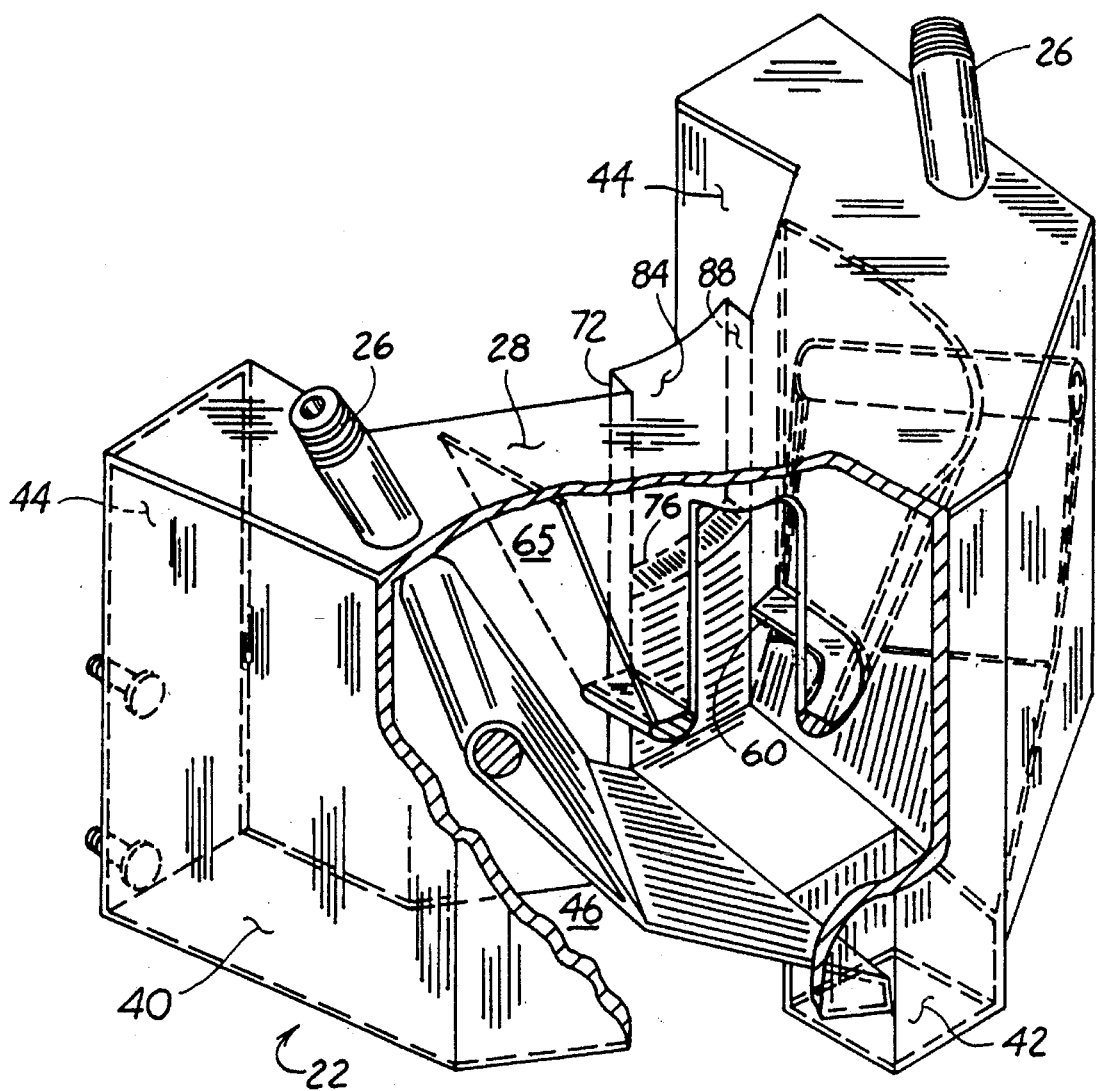
FIG. 8 is an enlarged isometric view of the bubble generator first shown in FIG. 5, illustrating an alternate embodiment for the slot.
Figure 9:
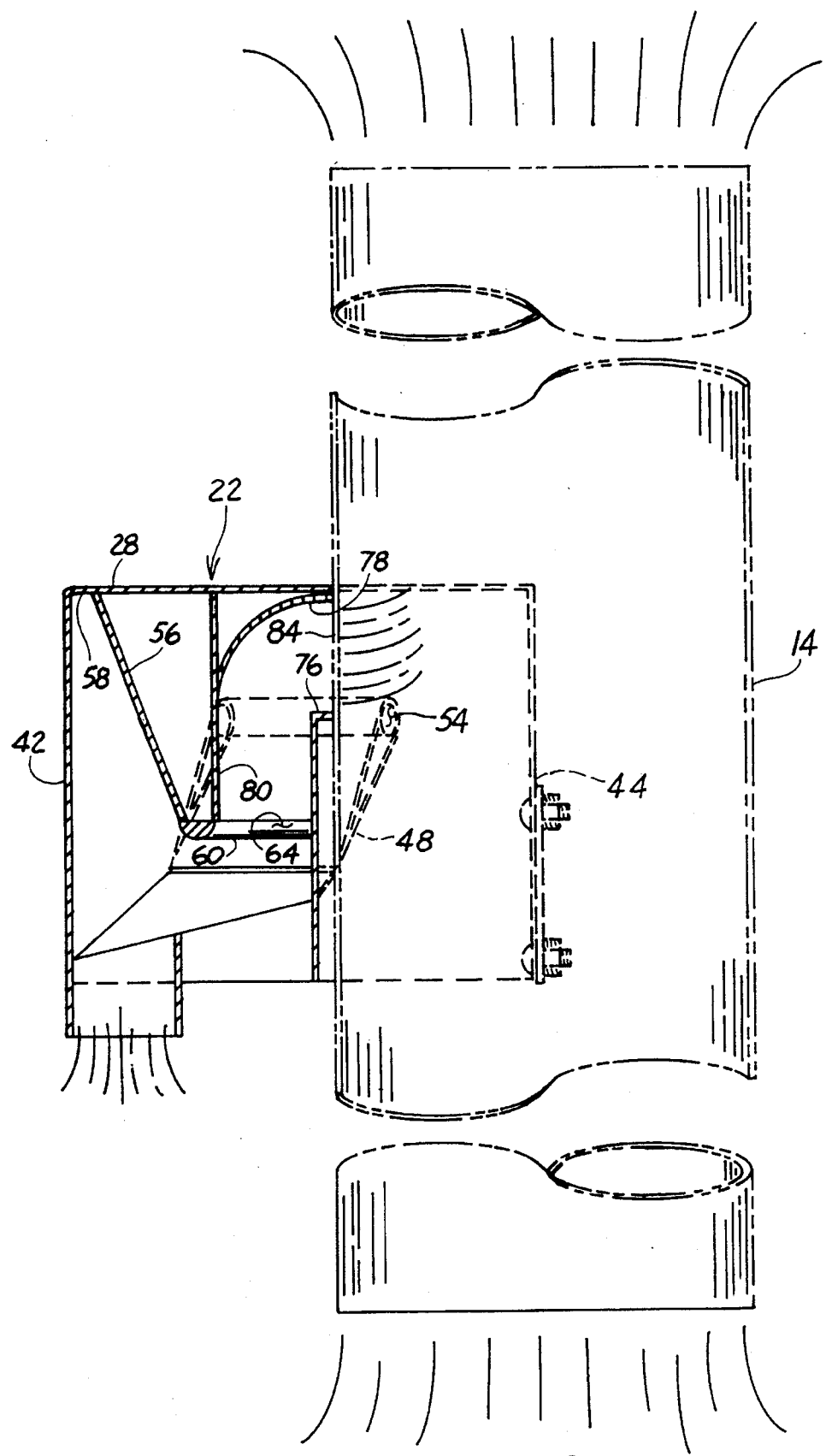
FIG. 9 is a sectioned elevational view of the bubble generator and the stackpipe, illustrating the slot first shown in FIG. 8.

FIGS. 8 and 9 illustrate a modification over the slot 74 shown in FIGS. 5–7. In FIGS. 8 and 9 the vertical length of an aperture or slot 84 is closed down by not going as far down as the slot 74 of FIGS. 5–7. The size of the slot 84 would depend upon such factors as the gas feed rate to the generator 22, the gas pressure of the system, and the desired velocity for propelling the material 12 up the stackpipe 14. For example, at low gas feed rates the large gas bubbles would have time to form stable, unitary, cohesive bubbles in the generator 22 with slot 74. But, since fewer large bubbles per unit time (measured in seconds, for example) are being generated at lower gas feed rates to the generator 22, it would improve large bubble transfer into the stackpipe 14 by closing down the slot as shown in FIGS. 8 and 9. The size or vertical length of the slot 84 is shown by way of example; each generator 22 shown in FIGS. 8 and 9 would be built to the specifications of the holding tank into which the device 10 is installed. FIG. 9 shows the curved plate 78 secured to the top plate 28 and the inside curved surface 80. The generator 22 shown in FIGS. 8 and 9 would also accommodate the angled flat plate 82.

Figure 10:
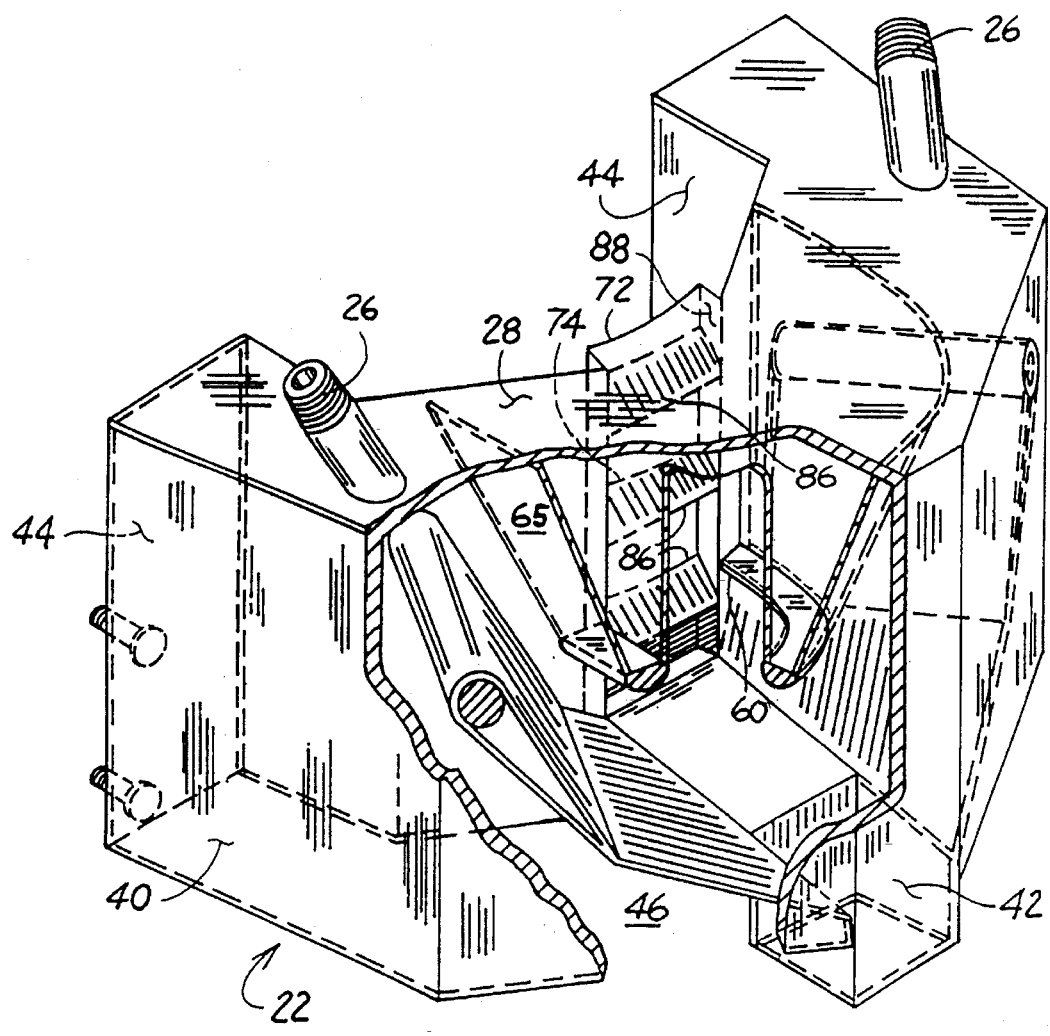
FIG. 10 is an enlarged isometric view of the bubble generator first shown in FIG. 5 illustrating a plurality of bubble vane guides.
Figure 11:
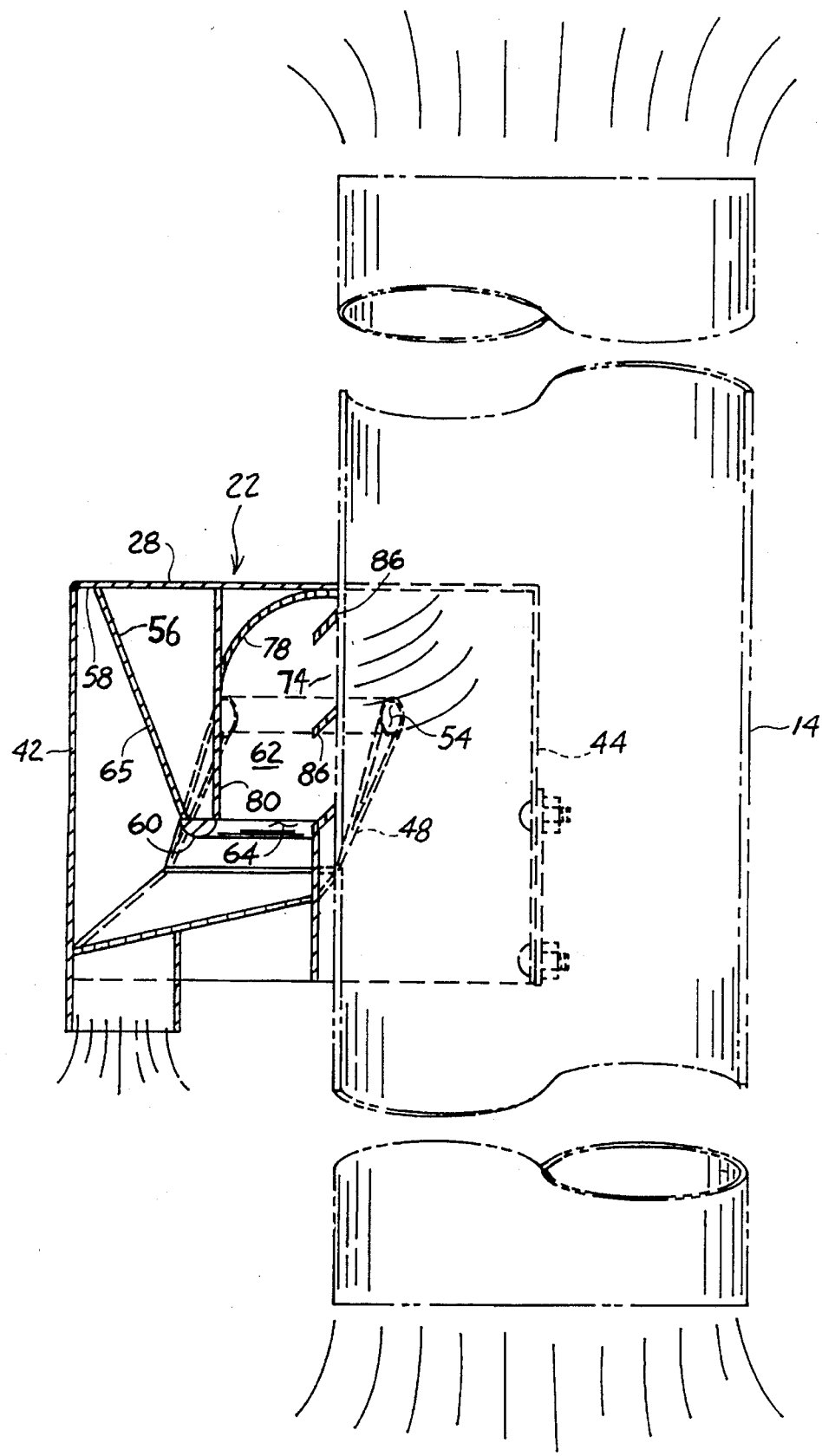
FIG. 11 is a sectioned elevational view of the bubble generator first shown in FIG. 10.

FIGS. 10 and 11 illustrate a further embodiment to ease the bubbles out of the generator 22 and into the stackpipe 14. FIGS. 10 and 11 illustrate a plurality of angled or tilted bubble vane guides 86 which transversely extend within the slot 74 from an inside surface 88 of one vertically-extending portion of the lip 72 to the surface 88 of the opposite vertically-extending portion of the lip 72. The guides 86 do not project into the cavity 62 nor do they project outwardly past the lips 72 and into the stackpipe 14. The number of guides 86 would be dependent upon the length of the slot 74, and the spacing between the guides 86 would depend upon numerous factors, including the gas feed rate into the generator 22, the gas pressure, and the volume of the tank.

The rectangular-shaped guides 86 will be positioned in the slot at a 45° angle for laterally guiding and transferring the bubbles into the stackpipe 14 as large, unified, well-formed bubbles and not the narrow bubbles that would be generated if the gas bubbles all had to rise up to the top of the cavity 62 before transferring into the stackpipe 14. The 45° angle or cant of the guides 86 is the optimum between horizontal and vertical vane guides. Using the 45° angle provides each bubble with an equal amount of thrust into and up the stackpipe 14. It is quite possible that a 60° angle for the guides 86 would provide an even better lateral transfer and thrust of bubbles into the stackpipe 14. Using the guides 86 of FIGS. 10 and 11 permits the bubbles to clear and transfer from the generator 22 into the stackpipe 14 at intermediate points along the vertical length of the cavity 62. At high gas feed rates into the generator 22 the bubbles would form and quickly transfer into the stackpipe 14 as well-defined units, and would not stack up in the cavity 62 and would become distorted or deformed. The guides 86 would allow the bubbles to be more quickly disengaged from the generator 22 for lateral transfer into the stackpipe 14. The guides 86 are particularly effective at gas feed rates over 35 SCFM. In addition, the guides 86, or louvers, give the bubbles a higher velocity of transfer toward the centerline of the stackpipe 14, thus facilitating the formation of continuous, large, well-formed bubbles into the stackpipe 14. Finally, the curved plate 78 or the angled flat plate 82 can be utilized with the guides 86 shown in FIGS. 10 and 11. In addition, one or more of the guides 86 could have a curvature similar to that of plate 78, and such a curvature would also enhance and facilitate transfer of the bubbles into the stackpipe 14.

Figure 12:
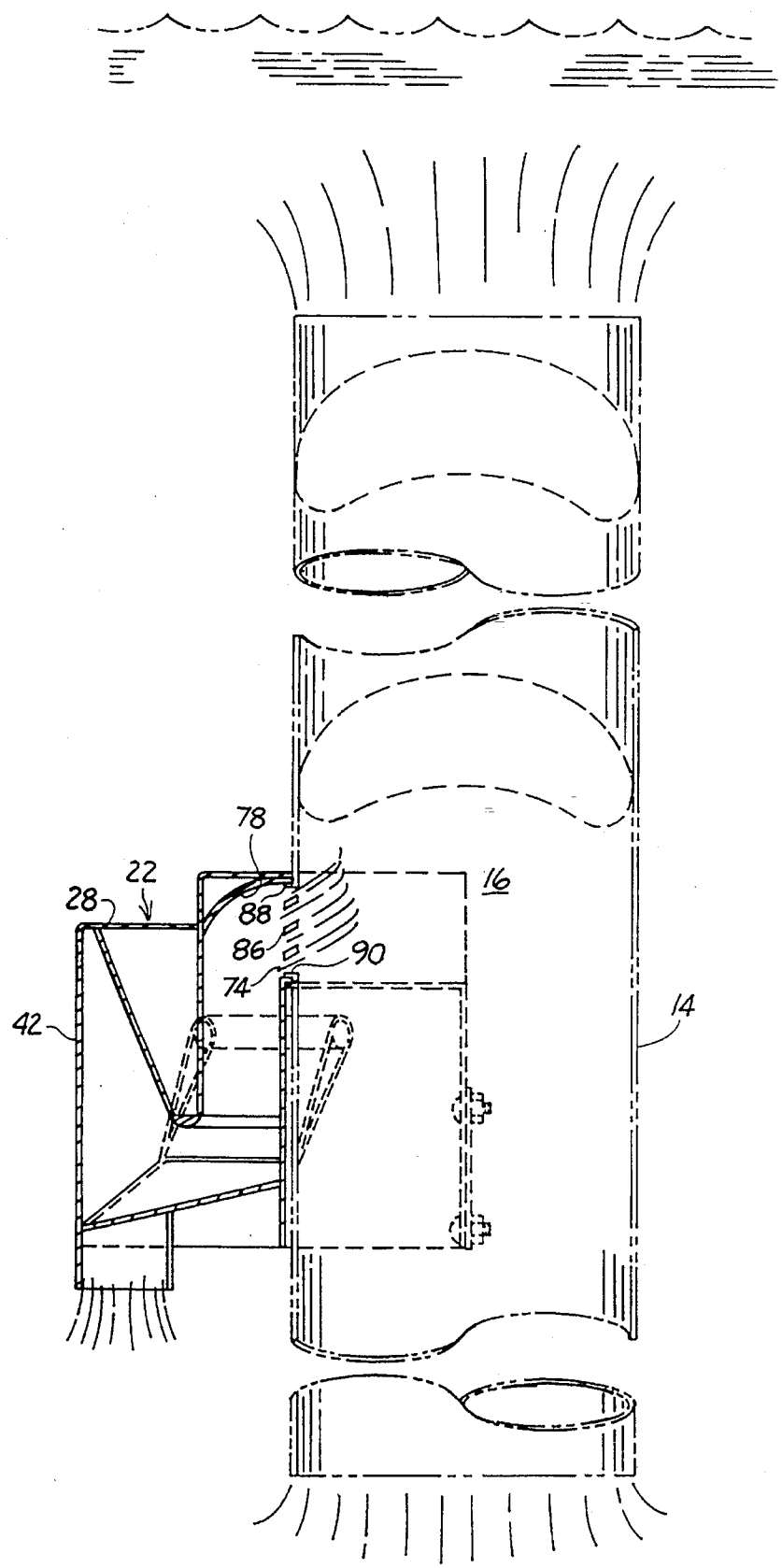
FIG. 12 is a sectioned elevational view of the bubble generator first shown in FIG. 10 illustrating the vane guides secured to the stackpipe.

FIG. 12 illustrates an alternative placement for the vane guides 86. In FIG. 12 an upper lip 88 and a lower lip 90 protrude slightly outwardly from the surface of the stackpipe 14. The lips or flanges could also extend around the periphery of the stackpipe opening. In either case the guides 86 would extend transversely across the stackpipe opening, and would be secured by suitable means (welded or attached to brackets) to the peripheral vertical side portions of the stackpipe opening. The guides 86 could be slightly curved or straight in their extension across the stackpipe opening; however, the guides 86 would not be positioned so that they would actually protrude into the passageway 16 of the stackpipe 14. If the guides 86 protruded into the passageway 16, fibrous material traveling up the passageway 16 with the material 12 would hang up on the guides 86 and obstruct further movement of the bubbles and material 12 into and up through the stackpipe 14.

It should be noted that many structural components of the device 10 could be coated with a thermoplastic material, such as Teflon, to allow the bubbles to easily and quickly slide out and disengage from the generator 22 for transferring into the stackpipe 14. Any surface upon which the bubbles contact and slide could be Teflon coated, and the entire generator 22 could, in principal, be made out of Teflon.

While there have been described and illustrated preferred embodiments of the present invention, it is apparent that numerous omissions, additions, and alterations may be made without departing from the spirit thereof.

We claim:

1. In a device for submersible placement in a holding tank containing a body of substantially liquid material for generating a continuous circulation of the material, the device comprising an elongated stackpipe having a stackpipe opening, a bubble generator secured to the stackpipe and in flow communication with the stackpipe opening for delivering bubbles into the stackpipe in order to propel the material up through the stackpipe, the generator including a pair of spaced-apart, oppositely-disposed baffle members located within the generator and a cone-shaped member disposed between the baffle members for assisting bubble formation, the cone-shaped member including an inner cavity in flow communication with the stackpipe opening so that liquid material and bubbles can pass from the generator into the stackpipe, the improvement comprising:

a back plate secured to the bubble generator, the back plate including an elongated slot which is in flow communication with the stackpipe opening and the inner cavity of the cone-shaped member; and a plurality of spaced-apart vane guides attached to the back plate and extending transversely across the slot for facilitating the lateral transfer of bubbles from the bubble generator into the stackpipe.

2. The device of claim 1 wherein the vane guides are positioned within the slot at a 45° angle for facilitating lateral transfer of stable, cohesive, well-formed bubbles into and up the stackpipe.

3. The device of claim 1 further comprising a rounded plate disposed within the inner cavity of the cone-shaped member and attached to the bubble generator for guiding the bubbles from the inner cavity into the stackpipe with increased momentum and less energy loss.

4. The device of claim 1 further comprising a slanted plate disposed within the inner cavity of the cone-shaped member and attached to the bubble generator for guiding the bubbles from the inner cavity into the stackpipe with increased momentum and less energy loss.

* * * * *